US012265452B2

(12) United States Patent
Kuppuswamy et al.

(10) Patent No.: US 12,265,452 B2
(45) Date of Patent: Apr. 1, 2025

(54) AUTO-RECOVERY OF KNOWN APPLICATION/WORKFLOW FAILURES

(71) Applicant: Dell Products L.P., Round Rock, TX (US)

(72) Inventors: Sridharan Kuppuswamy, Bangalore (IN); Shantanu Joshi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 18/295,317

(22) Filed: Apr. 4, 2023

(65) Prior Publication Data
US 2024/0338278 A1  Oct. 10, 2024

(51) Int. Cl.
*G06F 11/07* (2006.01)
*G06F 11/14* (2006.01)

(52) U.S. Cl.
CPC ...... *G06F 11/1415* (2013.01); *G06F 11/0721* (2013.01); *G06F 11/0772* (2013.01)

(58) Field of Classification Search
CPC ............. G06F 11/1415; G06F 11/0721; G06F 11/0772
USPC ...................................... 714/15, 51
See application file for complete search history.

(56) References Cited

U.S. PATENT DOCUMENTS

| | | | | |
|---|---|---|---|---|
| 2016/0246667 A1* | 8/2016 | Kumar Rao | ........ | G06F 11/0793 |
| 2021/0157665 A1* | 5/2021 | Rallapalli | ........... | G06F 11/3068 |
| 2022/0283891 A1* | 9/2022 | Bolagani | ............ | G06F 11/0793 |
| 2023/0315604 A1* | 10/2023 | Cozma | ................ | G06F 11/3409 |
| | | | | 718/103 |

* cited by examiner

*Primary Examiner* — Chae M Ko
(74) *Attorney, Agent, or Firm* — DALY, CROWLEY, MOFFORD & DURKEE, LLP

(57) ABSTRACT

An example methodology includes, by a computing device, monitoring a status of a workflow execution and, responsive to a determination of a failure of the workflow execution, determining whether an error associated with the failure is a known error. The method also includes, responsive to a determination that the error is a known error, comparing an audit trail of the workflow execution with a failure scenario documented for the known error and, responsive to validating that the audit trail is the documented failure scenario, performing one or more recovery actions documented for the known error. The method may also include, responsive to a determination that the error is not a known error, determining one or more recovery actions for the error and the audit trail, and updating a record of known failures with the error, the audit trail, and the one or more recovery actions.

18 Claims, 7 Drawing Sheets

AUTO-RECOVERY OF KNOWN APPLICATION/WORKFLOW FAILURES

BACKGROUND

Applications and workflows may be subject to failures during execution. Currently, if an application fails during execution, people are relied upon to fix the failed application. For example, upon a failure of an application, a support engineer may be called to fix the failed application. The support engineer may have access to documents, e.g., physical documents, electronic documents, or help system, which outline or document steps to fix known or recurring issues with the application. The support engineer can then utilize the documents to diagnose the issue(s) that caused the failure and implement the steps to fix the issues. And, once the issues are fixed, the support engineer can restart/resume execution of the application. Unfortunately, this is a cumbersome labor-intensive process, and the application remains in the failed state until manually attended to and fixed by the support engineer. The same cumbersome labor-intensive process also applies to fixing failed workflows.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, monitoring a status of a workflow execution and, responsive to a determination of a failure of the workflow execution, determining whether an error status code associated with the failure is a known error status code. The method also includes, by the computing device, responsive to a determination that the error status code is a known error status code, comparing an audit trail of the workflow execution with a failure scenario documented for the known error status code and, responsive to validating that the audit trail is the documented failure scenario based on the comparing, performing one or more recovery actions documented for the known error status code and the documented failure scenario.

In some embodiments, the method also includes, responsive to a determination of no failure of the workflow execution, continuing, by the computing device, monitoring the status of the workflow execution.

In some embodiments, monitoring the status of the workflow execution includes checking a status log.

In some embodiments, the method also includes, responsive to a determination that the error status code associated with the failure is not a known error status code, by the computing device, documenting the error status code and the audit trail of the workflow execution, determining one or more recovery actions for the documented error status code and the audit trail, and updating a record of known failures with the error status code, the audit trail, and the one or more recovery actions.

In some embodiments, the method also includes, responsive to failing to validate that the audit trail is the documented failure scenario, by the computing device, documenting the error status code and the audit trail of the workflow execution, determining one or more recovery actions for the documented error status code and the audit trail, and updating a record of known failures with the error status code, the audit trail, and the one or more recovery actions.

In one aspect, the audit trail is generated by the workflow. In one aspect, the audit trail is of one or more events preceding the failure of the workflow execution.

In some embodiments, the status of the workflow execution is provided by the workflow execution.

In some embodiments, the workflow execution includes an execution of an application.

In accordance with one illustrative embodiment provided to illustrate the broader concepts, systems, and techniques described herein, a method includes, receiving, from a high availability (HA) system, information about a failure and an audit trail associated with the failure and, responsive to a determination that an error status code associated with the failure is a known error status code, comparing an audit trail of the failure with a failure scenario documented for the known error status code. The method also includes, responsive to validating that the audit trail is the documented failure scenario based on the comparing, performing one or more recovery actions documented for the known error status code and the documented failure scenario.

In some embodiments, the failure is an application execution failure within the HA system.

In some embodiments, the method also includes, responsive to a determination that the error status code associated with the failure is not a known error status code, documenting the error status code and the audit trail of the failure, determining one or more recovery actions for the documented error status code and the audit trail, and updating a record of known failures with the error status code, the audit trail, and the one or more recovery actions.

In some embodiments, the method also includes, responsive to failing to validate that the audit trail is the documented failure scenario, by the computing device, documenting the error status code and the audit trail of the failure, determining one or more recovery actions for the documented error status code and the audit trail, and updating a record of known failures with the error status code, the audit trail, and the one or more recovery actions.

In some embodiments, the audit trail is of one or more events preceding the failure.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to any one of the aforementioned methods or any described embodiment thereof.

According to another illustrative embodiment provided to illustrate the broader concepts described herein, a non-transitory machine-readable medium encodes instructions that when executed by one or more processors cause a process to be carried out, the process corresponding to any one of the aforementioned methods or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Applications and workflows are prone to failures and errors during execution. When an application/workflow executing on a system fails or encounters an error, the application/workflow will remain in the failed state until the issue that caused the failure/error is properly identified and fixed. In some instances, the issue that caused the failure/error may be with the underlying system (e.g., a broken computer process, broken computer hardware or software, etc.).

Disclosed herein are concepts, structures, and techniques for auto-recovery of known application and/or workflow failures. In some embodiments, application/workflow execution health status can be monitored to detect application/workflow failures. Upon detecting a failure, a database of known failures can be checked to determine if an error status code associated with the failure of the application/workflow execution is a known error status code. If the error status code is a known error status code, an audit trail preceding the failure can be validated to confirm that the audit trail is a failure scenario associated with the known error status code (e.g., confirm that the failure is a known failure). Upon validating that the audit trail, action(s) documented for the known error status code and the failure scenario that is confirmed to be the same as the audit trail can be performed in an attempt to recover the failed application/workflow execution. If the error status code is not a known error status code or the validation of the audit trail fails, the error status code and the audit trail (e.g., the audit trail leading up to the application/workflow failure that resulted in the failure) can be documented. The documented error status code and the audit trail may then be used to resolve (e.g., debug) the failure. Numerous configurations and variations will be apparent in light of this disclosure.

Figure 1:
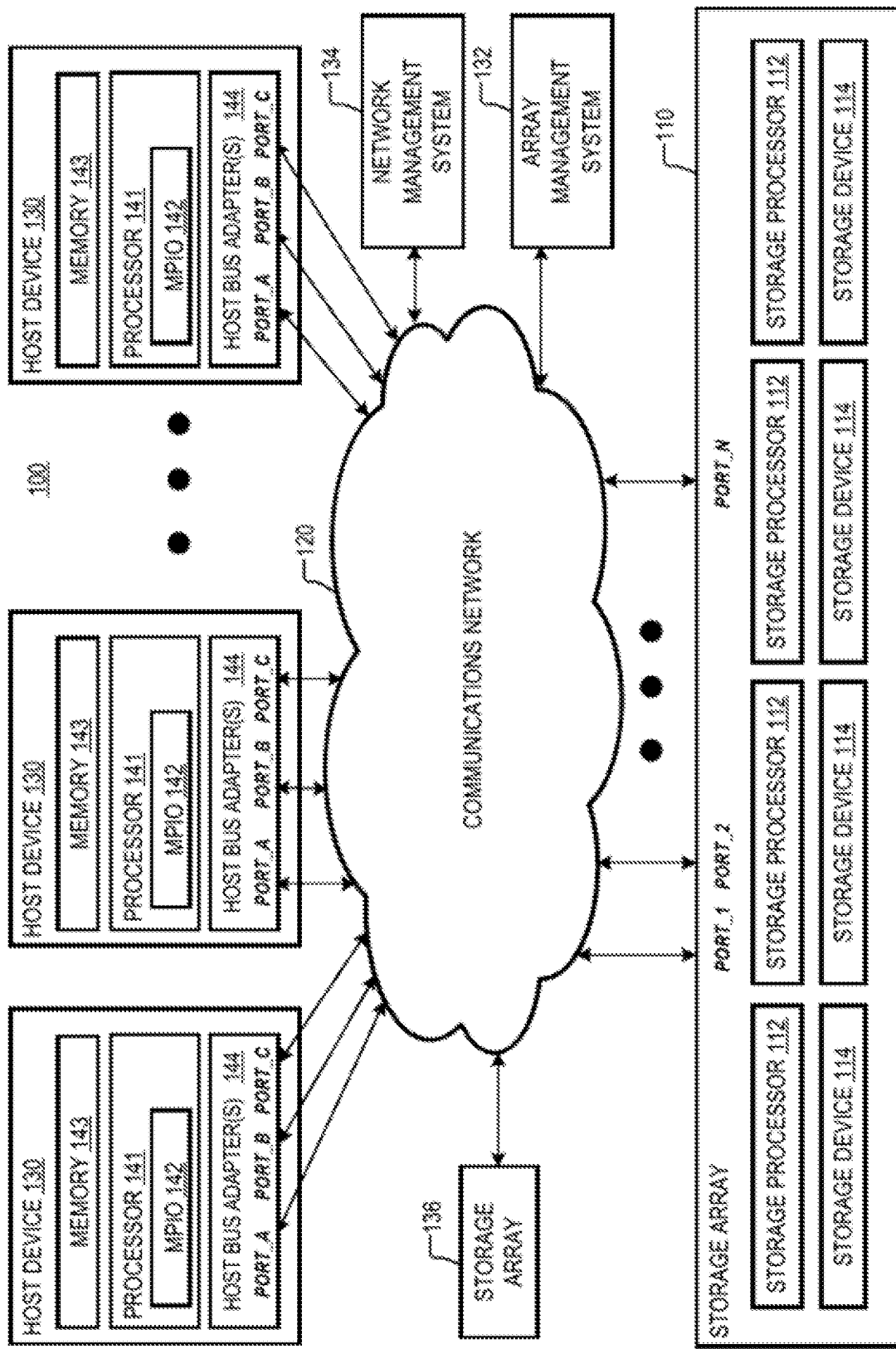
FIG. 1 is a block diagram of an illustrative storage system within which embodiments of the present disclosure may be utilized.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 700 of FIG. 7. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, an WiFi adapter, a local area network (LAN) adapter, etc.

Each processor 141 may be configured to execute a multi-path I/O (MPIO) driver 142. MPIO driver 142 may comprise, for example, PowerPath™ drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 7:
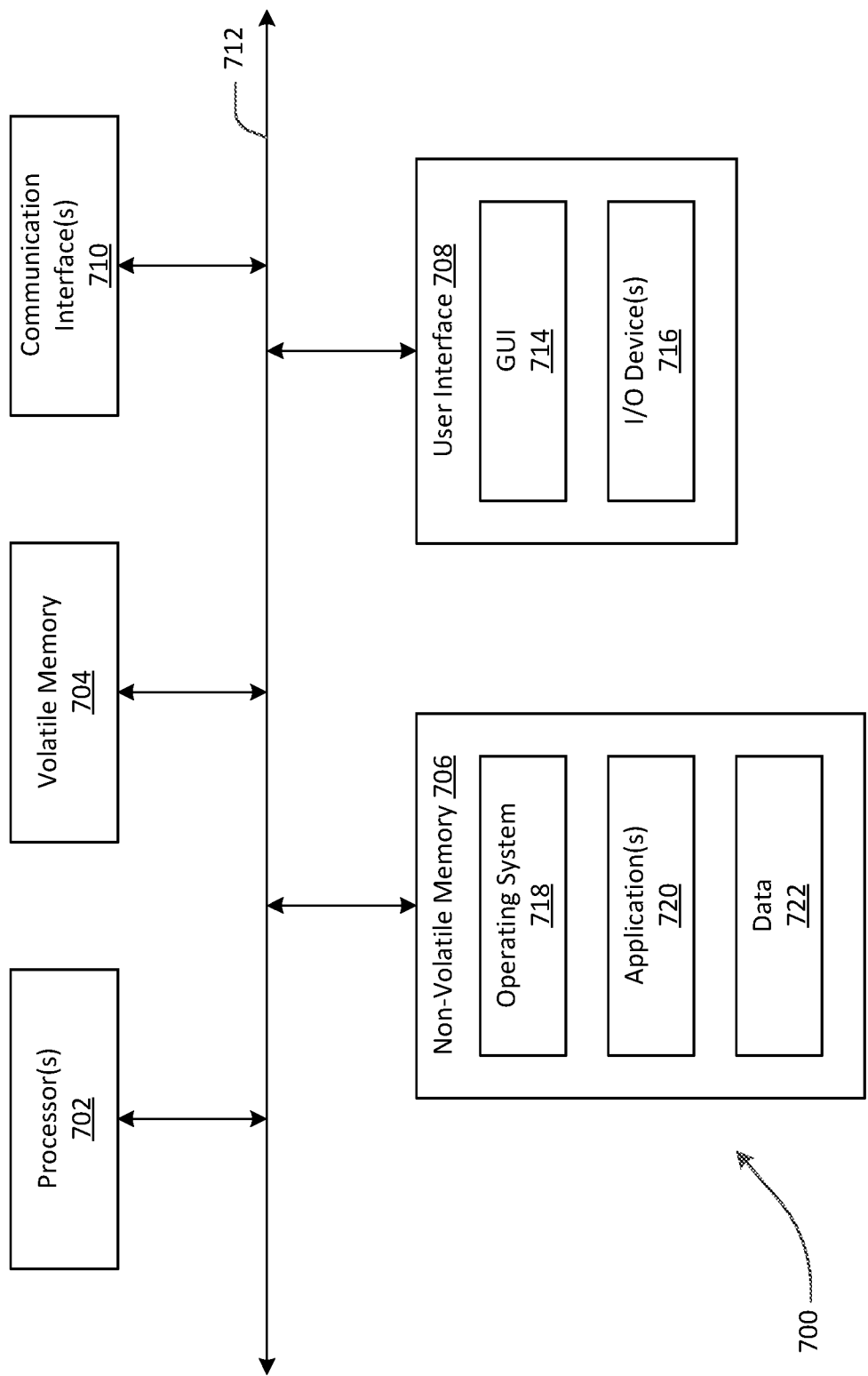
FIG. 7 is a block diagram illustrating selective components of an example computing device in which various aspects of the disclosure may be implemented, in accordance with an embodiment of the present disclosure.

Array management system 132 may include a computing device, such as computing device 700 of FIG. 7. Array management system 132 may be used by a system administrator to re-configure storage array 110, e.g., when degraded performance of storage array 110 is detected.

Network management system 134 may include a computing device, such as computing device 700 of FIG. 7. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
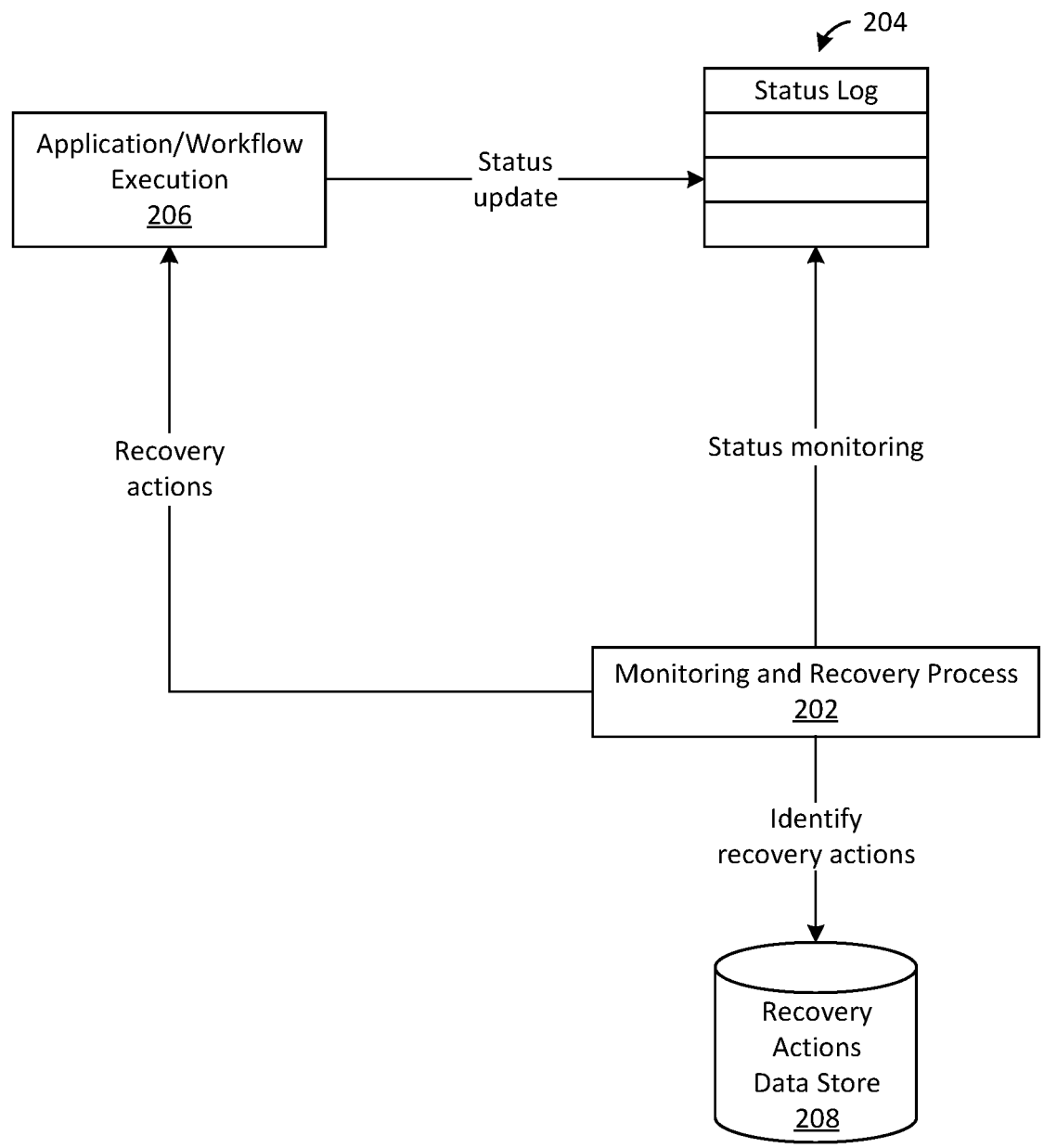
FIG. 2 is a simplified diagram showing an example system topology that can be used for auto-recovery of known application/workflow failures, in accordance with an embodiment of the present disclosure.

Referring now to FIG. 2, shown is a simplified diagram showing an example system topology that can be used for auto-recovery of known application/workflow failures, in accordance with an embodiment of the present disclosure. Such a topology can be understood as a cyclical process in which a monitoring and recovery process 202 leverages a status log 204 to monitor for and automatically recover workflow/application execution failures. In some embodiments, monitoring and recovery process 202 may run (e.g., execute) on storage processor 112 of storage system 100 of FIG. 1. However, disclosed structures and techniques are not limited to storage systems or any other particular type of client-server systems and may be broadly applicable to any systems that involve the execution of applications/workflows.

As shown in FIG. 2, one or more applications/workflows may be executing on a system, such as, for example, a storage system (e.g., storage system 100 of FIG. 1). See reference numeral 206 in FIG. 2. As used herein, the term "workflow" refers to a sequence of events and/or actions, which may include execution of one or more applications, to accomplish a task. By way of an example, a workflow may be to upgrade and/or install an operating system or components of an operating system on the system. In some embodiments, when a particular application/workflow executing on the system encounters a failure, the application/workflow can store an error status code and an audit trail (e.g., record of one or more events preceding the failure), among other relevant information about the encountered failure, to status log 204. Non-limiting examples of events that can be recorded in an audit trail include access of a file (e.g., open file, read file, write file), an operating system call, an application programming interface (API) call, a data storage access, and a database query, among others. In other embodiments, the applications/workflows executing on the system can record their health status (e.g., normal status codes and error status codes) and audit trails to status log 204 on a continuous basis. For example, an executing application/workflow can record such data to status log 204 at each step of its process and/or execution. In some implementations, an execution environment in which applications/workflows are executing within, such as containers for container-based applications, can record the application/workflow execution status codes (e.g., error stratus codes) and audit trails to status log 204.

In some embodiments, monitoring and recovery process 202 can check status log 204 for failed applications/workflows on a continuous or periodic basis. For example, monitoring and recovery process 202 can check status log 204 for failed applications/workflows according to a predetermined schedule or timetable. The schedule or timetable may be configured as part of an execution policy. In some implementations, monitoring and recovery process 202 may be a daemon (e.g., an operating system daemon) process on the system. Monitoring and recovery process 202 can detect failed applications/workflows from the information stored in status log 204. In other words, monitoring and recovery process 202 can use the information in status log 204 to detect a failure of an application/workflow (e.g., determine that an application/workflow execution has failed).

In response to detecting a failed application/workflow (i.e., determination of a failure of a particular application/workflow execution), monitoring and recovery process 202 can check to determine whether an error associated with the failure of the application/workflow is a known error. As described above, upon encountering execution failures, the applications/workflows can store error status codes and audit trails, among other relevant information about encountered failures, to status log 204. To determine whether an error associated with the failure of the application/workflow is a known error, monitoring and recovery process 202 can check the known error status codes stored (e.g., recorded) in a recovery actions data store 208. For example, monitoring and recovery process 202 can check recovery actions data store 208 for the error status code recorded in status log 204 for the application/workflow execution failure. That is, monitoring and recovery process 202 can check recovery actions data store 208 for the error status code associated with the failure of the application/workflow execution.

Recovery actions data store 208 can include a database or other form of storage configured to store information related to application/workflow failures (e.g., application/workflow execution failures). For example, in one implementation, recovery actions data store 208 can store known error status codes for the various applications/workflows and, for each error status code, a sequence of events leading up to an application/workflow execution failure that resulted in the error status code. Such sequence of events is sometimes referred to herein as a "failure scenario." It is appreciated that different application/workflow failures can be indicated by the same error status code. It is also appreciated that the sequence of events preceding a failure may impact the actions that need to be performed to fix the failure. That is, the actions that need to be performed to recover an application/workflow execution failure may be influenced by the sequence of events that led to the application/workflow execution failure. As a result, multiple failure scenarios may be documented for the same error status code in recovery actions data store 208. Recovery actions data store 208 may be hosted on the same system as monitoring and recovery process 202 (i.e., the system on which monitoring and recovery process 202 is running on). In other implementations, recovery actions data store 208 may be hosted remotely from monitoring and recovery process 202 (e.g., hosted within a cloud environment). Further description of recovery actions data store 208 is provided below at least with respect to FIG. 4.

Having determined that the error status code recorded in status log 204 for the application/workflow execution failure is a known error status code, monitoring and recovery process 202 can validate an audit trail of the application/workflow execution. An audit trail may include one or more events preceding a failure of an application/workflow execution (e.g., an audit trail that led to the failure of the application/workflow execution). As explained above, one or more failure scenarios may be documented for the same known error status code. Thus, monitoring and recovery process 202 validates the audit trail is the same as a failure scenario documented for the known error status code to identify the known error status code with the correct failure scenario. For example, monitoring and recovery process 202 can compare the audit trail of the failed application/workflow execution with the various failure scenarios documented for the known error status code in recovery actions data store 208 to validate that the audit trail is one of the failure scenarios documented for the known error status code.

Having validated that the audit trail is one of the failure scenarios documented for the known error status code, monitoring and recovery process 202 can perform one or more recovery actions documented for the known error status code and the documented failure scenario confirmed to be the same as the audit trail. In some embodiments, recovery action(s) for recovering from known application/workflow failures may be provided with the applications/workflows. For example, the recovery action(s) to perform to recover from failures of an application/workflow execution that resulted in the known error status codes and the documented failure scenarios may be provided when the application/workflow is downloaded, installed, or otherwise provided to the system. The provided failure scenarios can then be stored along with their respective error status codes and documented failure scenarios in recovery actions data store 208. In any case, upon validating the audit trail, monitoring and recovery process 202 can determine from recovery actions data store 208 the one or more recovery actions to perform to recover from an application/workflow execution failure that resulted in the known error status code and associated with the documented failure scenario. Monitoring and recovery process 202 can then perform the one or more recovery actions to recover the failed application/workflow (e.g., attempt to recover the application/workflow execution failure).

In some embodiments, upon determining that the error status code recorded in status log 204 for the application/workflow execution failure is not a known error status code or failing to validate the audit trail as one of the failure scenarios documented for the known error status code, monitoring and recovery process 202 can document (e.g., record) the error status code and the audit trail of the application/workflow execution. For example, monitoring and recovery process 202 can store the details of the error status code and the audit trail of the application/workflow execution to a data store where it can subsequently be retrieved and used. In some embodiments, monitoring and recovery process 202 can provide a notification/alert informing that the error status code recorded for the application/workflow execution failure is not a known error status code. In cases of failure to validate the audit trail, monitoring and recovery process 202 can provide a notification/alert informing of the failure to validate the audit trail. In any case, information about how the details of the documented error status code and the audit trail can be accessed (e.g., retrieved) may be included in the notification/alert. For example, the notification/alert may be provided within a user interface (UI) displayed on the system (e.g., within a UI of a monitoring console). As another example, the notification/alert may be included in a message (e.g., email message, text message, or other electronic message) sent to a technical specialist or other user responsible for monitoring execution of applications/workflows on the system. In any case, the details of the documented error status code and the audit trail can be used to debug the issue with the failed application/workflow execution (e.g., debug the application/workflow execution failure as it happened). For example, a technical specialist may use or direct one or more automated tools to debug the issues that caused the failure and identify (e.g., create) one or more recovery actions to recover from the failure. If the application/workflow failure is successfully debugged, the error status code can be recorded as a known error status code and the audit trail can be used as a failure scenario associated with the known error status code. In one embodiment, monitoring and recovery process 202 can update recovery actions data store 208 with the new known error status code, associated failure scenario, and the one or more recovery actions to perform to recover the failed application/workflow.

Figure 3:
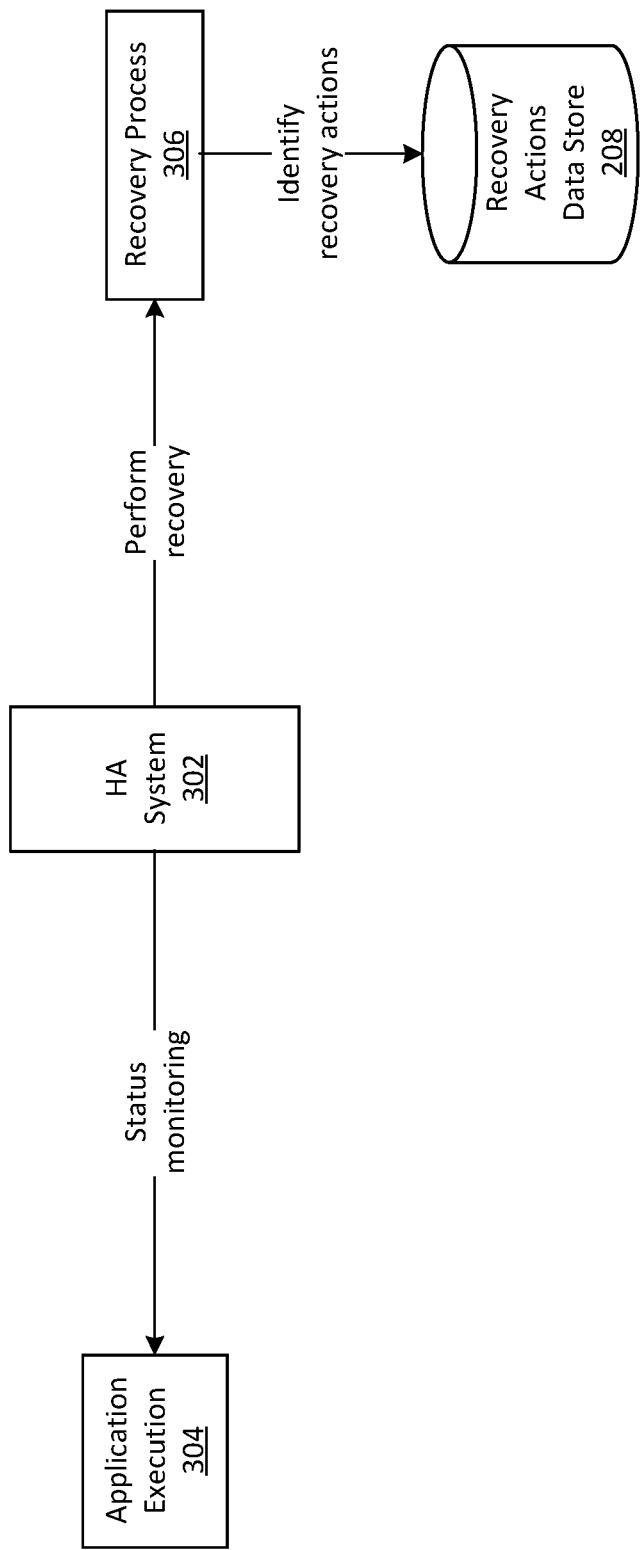
FIG. 3 is a simplified diagram showing an example system topology that can be used for auto-recovery of known application failures in a high availability (HA) system, in accordance with an embodiment of the present disclosure.

Referring now to FIG. 3, and with reference to recovery actions data store 208 of FIG. 2, shown is a simplified diagram of an example system topology that can be used for auto-recovery of known application failures in a high availability (HA) system, in accordance with an embodiment of the present disclosure. As shown, a HA system 302 may be monitoring the status (e.g., health status) of one or more applications executing on the system (e.g., a high availability storage system). See reference numeral 304 in FIG. 3. For example, in a virtualized environment (e.g., a virtualized or emulated storage system including virtualized or emulated components), a guest operating system (OS) may utilize HA system 302 to monitor the health status of the applications executing on the virtual infrastructure. HA system 302 provides high availability to the executing applications via automatic failover. For example, HA system 302 can monitor the health status of the executing applications (e.g., monitor the operation of the applications that are executing) and, in response to detection of a failure of an executing application, attempt to restart the failed application. If the attempted restart of the failed application fails, HA system 302 can failover the application execution to a next available component (e.g., a next available system) to provide high availability. That is, HA system 302 can perform a failover operation to switch execution of the failed application to the next available component.

In some embodiments, prior to performing the failover operation, HA system 302 can utilize a recovery process 306 to automatically recover a failed application execution. In some implementations, the recovery operations of recovery process 306 may be substantially similar to the recovery operations described above for monitoring and recovery process 202 of FIG. 2. In more detail, upon detecting a failure of an application execution and prior to performing the failover operation, HA system 302 can send a request to recovery process 306 to recover the failed application execution. The request sent to recovery process 306 can include information about the failed application execution, such as an error status code and an audit trail associated with the failure. In response, recovery process 306 can check to determine whether the error associated with the failed application is a known error. In other words, recovery process 306 can determine whether the error status code indicating the application execution failure is a known error status code. For example, recovery process 306 can check recovery actions data store 208 for the error status code provided with the request.

Having determined that the error status code provided with the request is a known error status code, recovery process 306 can validate the audit trail provided with the request. For example, recovery process 306 can compare the audit trail provided with the request with the various failure scenarios documented for the known error status code in recovery actions data store 208 to validate that the audit trail is one of the failure scenarios documented for the known error status code.

Having validated that the audit trail is one of the failure scenarios documented for the known error status code, recovery process 306 can determine from recovery actions data store 208 the one or more recovery actions to perform to recover from an application execution failure that resulted in the known error status code and associated with the documented failure scenario. Recovery process 306 can then perform the one or more recovery actions to recover the failed application (e.g., attempt to recover the application execution failure). In some embodiments, recovery process 306 may send or otherwise provide the results of the recovery operation in a response to the request to recover the failed application execution. For example, if the failed application is successfully recovered, recovery process 306 can send a response to HA system 302 informing that recovery of the failed application execution is successful. If the failed application is not successfully recovered, recovery process 306 can send a response to HA system 302 informing that recovery of the failed application execution has failed.

In some embodiments, upon determining that the error status code provided with the request is not a known error status code or failing to validate the audit trail provided with the request as one of the failure scenarios documented for the known error status code, recovery process 306 can document (e.g., record) the error status code and the audit trail provided with the request. The documented error status code and the audit trail may be used to debug the issues with the failed application execution. In some embodiments, recovery process 306 can update recovery actions data store 208 with new known error status codes, respective failure scenarios, and respective recovery action(s) to perform to recover failed applications. In some embodiments, recovery process 306 can send a response to HA system 302 informing that the application execution failure is not a known application execution failure.

Figure 4:
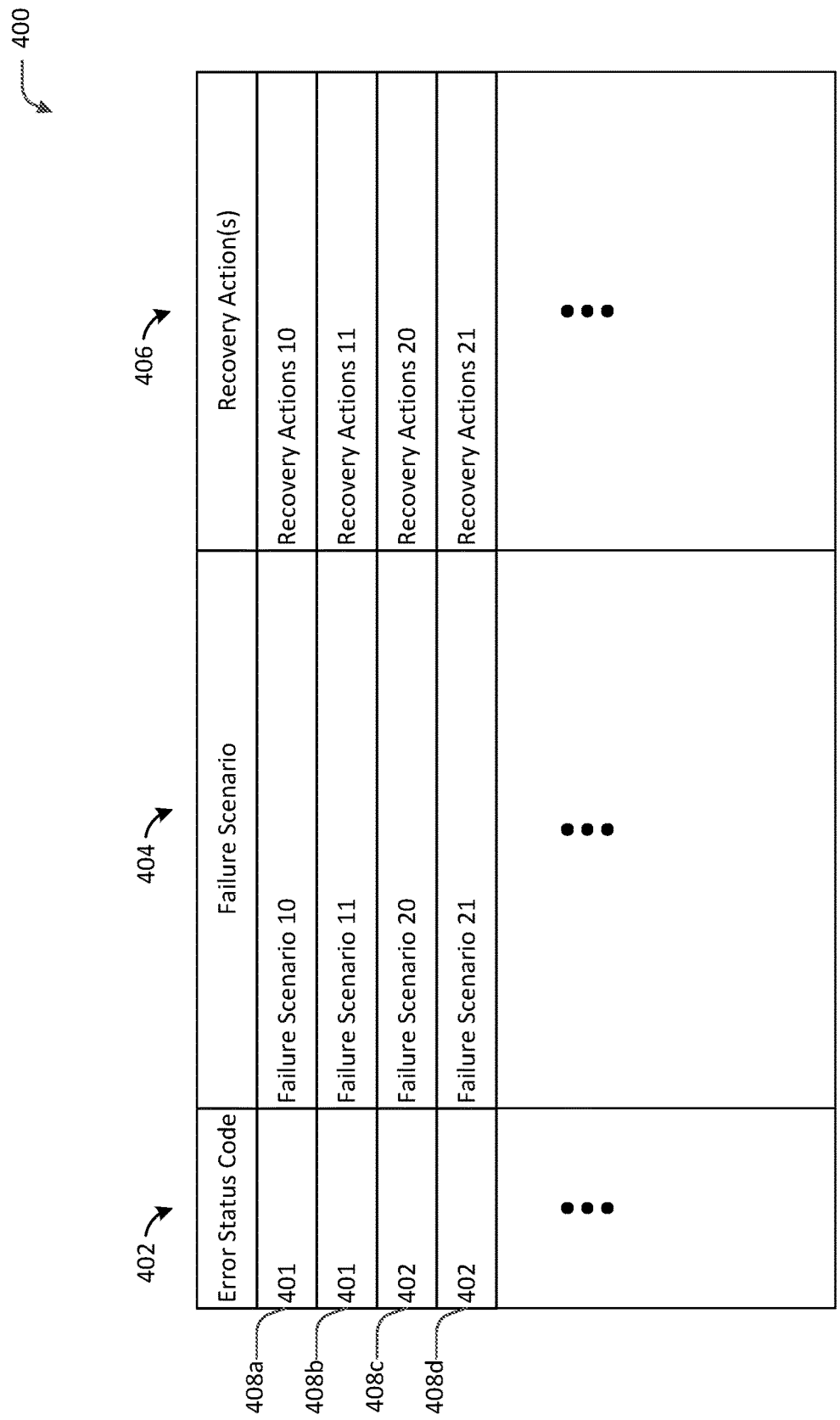
FIG. 4 is a diagram illustrating a portion of a data structure that can be used to record information about known application/workflow failures, in accordance with an embodiment of the present disclosure.

FIG. 4 is a diagram illustrating a portion of a data structure 400 that can be used to record information about known application/workflow failures, in accordance with an embodiment of the present disclosure. For example, illustrative data structure 400 may be generated to record known application/workflow failures and actions to perform to recover from the application/workflow failures, and then stored in stored in a data store (e.g., stored in recovery actions data store 208 of FIG. 2). As shown, illustrative data structure 400 may be in table form in which each row (or "record" or "entry") represents a known application/workflow failure. In the table, each record can include an error status code field 402, a failure scenario field 404, and a recovery action(s) field 406, which contain data related to each record.

Error status code field 402 can indicate an error status code (e.g., a known error status code) of a known failure. Failure scenario field 404 can indicate a sequence of events that led to the failure that resulted in the known error status code (i.e., indicate a failure scenario that led to the failure that resulted in the error status code indicated in error status code field 402). Recovery action(s) field 406 can indicate the action(s) to perform to recover the failure that resulted in the known error status code and the failure scenario that led to the failure (i.e., indicate the recovery action(s) to perform to recover the failure that resulted in the error status code indicated in error status code field 402 and the failure scenario indicated in failure scenario field 404).

In the example of FIG. 4, data structure 400 includes entries 408a-408d. Entry 408a is a record of a known failure identified by an error status code "401" and a failure scenario "Failure Scenario 10," which can be recovered by performing the recovery actions "Recovery Actions 10." Entry 408b is a record of a known failure identified by an error status code "401" and a failure scenario "Failure Scenario 11," which can be recovered by performing the recovery actions "Recovery Actions 11." Entry 408c is a record of a known failure identified by an error status code "402" and a failure scenario "Failure Scenario 20," which can be recovered by performing the recovery actions "Recovery Actions 20." Entry 408d is a record of a known failure identified by an error status code "402" and a failure scenario "Failure Scenario 21," which can be recovered by performing the recovery actions "Recovery Actions 21." Note that, although entries 408a and 408b are records of known failures identified by the same error status code (i.e., error status code "401"), the known failures recorded by entries 408a and 408b are different failures since they have different failure scenarios and different recovery actions. Similarly, although entries 408c and 408d are records of known failures identified by the same error status code (i.e., error status code "402"), the known failures recorded by entries 408c and 408d are different failures since they have different failure scenarios and different recovery actions.

The number of records of known error status codes depicted in data structure 400 is for illustration, and those skilled in the art will appreciate that there may be a different number of records of known error status codes, including very large numbers of records of known error status codes in data structure 400.

Figure 5:
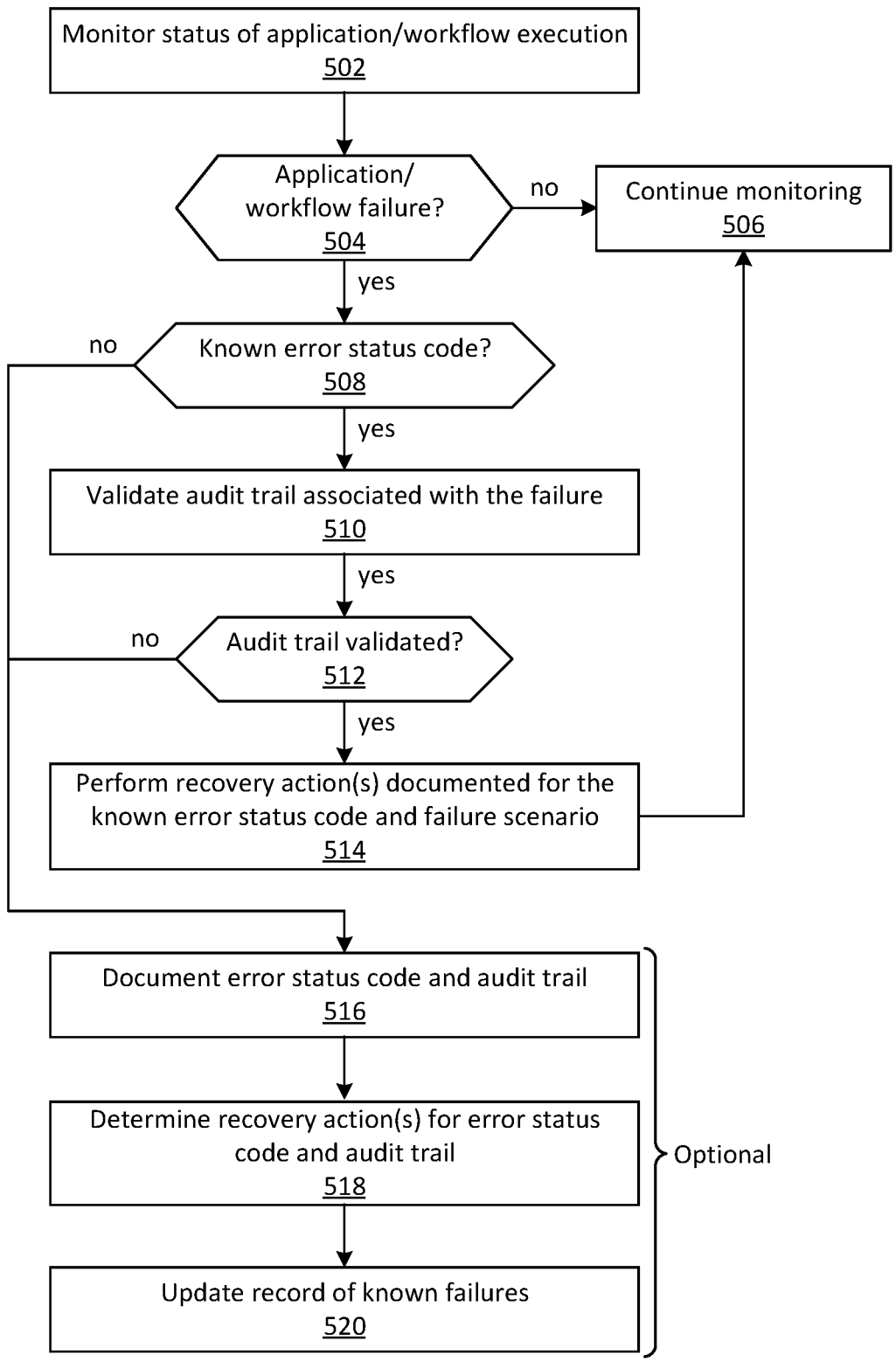
FIG. 5 is a flow diagram of an example process for auto-recovery of known application/workflow failures, in accordance with an embodiment of the present disclosure.

FIG. 5 is a flow diagram of an example process 500 for auto-recovery of known application/workflow failures, in accordance with an embodiment of the present disclosure. Illustrative process 500 may be implemented, for example, within the system described above in conjunction with FIG. 2.

With reference to process 500 of FIG. 5, at 502, status of application/workflow execution on a system may be monitored for failures. For the purposes of this discussion, it is assumed that the applications/workflows are executing on a storage system. It is also assumed that a monitoring process on the system (e.g., monitoring and recovery process 202 of FIG. 2) is monitoring the applications/workflows for failures. During execution, the applications/workflows may be recording their health status (e.g., normal status codes and error status codes) and associated audit trails to a health status log (e.g., status log 204 of FIG. 2) on the system. The monitoring process may check the health status log for records of application/workflow execution failures (e.g., check for records of error status codes).

At 504, if it is determined that there are no application/workflow execution failures, then, at 506, monitoring of the application/workflow execution may continue. For example, the monitoring process can continue checking the health status log for records of error status codes.

Otherwise, if, at 504, it is determined that there is an application/workflow execution failure (i.e., there is a failure of an application/workflow execution), then, at 508, a check may be performed to determine whether the error status code recorded for the application/workflow execution failure is a known error status code. The check here is to determine whether the error status code recorded for the failure is a known documented error status code. For example, the monitoring process can check a data store (e.g., recovery actions data store 208 of FIG. 2) for the error status code recorded for the application/workflow execution failure.

If it is determined that the error status code is a known error status code, then, at 510, the audit trail associated with the failure may be validated. The validation is to confirm that the audit trail of the failure is one of the circumstances or incidents documented for the known error status code. For example, the monitoring process can compare the audit trail associated with the failed application/workflow execution to the failure scenarios documented in the data store for the known error status code to validate that the audit trail is one of the incidents documented for the known error status code. By way of a simple example, suppose a sequence of events A, B, C, and D is a failure scenario documented for known error status code X. In this example, an audit trail composed of a sequence of events C, D, and E for a failure is not validated to a failure scenario documented for known error status code X since the sequence of events C, D, and E and the sequence of events A, B, C, and D are different (i.e., not the same).

At 512, if it is determined that the audit trail is validated, then, at 514, recovery action(s) documented in the for the known error status code and the failure scenario may be performed to recover the failed application/workflow execution. Here, since the error status code reported for the failure is a known error status code and the audit trail associated with the failure is validated, it can be determined that the application/workflow execution failure is a known failure documented by the known error status code and the failure scenario confirmed to be the same as the audit trail. For example, the monitoring process can perform the recovery action(s) documented in the data store for the known error status code and the failure scenario confirmed to be the same as the audit trail. Upon performing the recovery action(s), the monitoring process can continue monitoring of the application/workflow execution at 506.

Otherwise, if, at 508, it is determined that the error status code is not a known error status code or, if, at 512, it is determined that the validation of the audit trail fails, then, at 516, the error status code and the audit trail associated with the failure may optionally be documented. Here, since the error status code reported for the failure is not a known error status code or the validation of the audit trail associated with the failure fails, it can be determined that the application/workflow execution failure is not a known failure. For example, the monitoring process can store details of the error status code and the audit trail associated with the failure to a data store where it can subsequently be retrieved and used.

At 518, one or more recovery actions for the error status code and the audit trail documented at 516 may optionally be determined. For example, the error status code and the audit trail documented at 516 may be retrieved from the data store and used to debug the issues that caused the failure and identify (e.g., create) one or more recovery actions to recover the failure.

At 520, a record of known application/workflow execution failures may be updated. For example, the monitoring process or another process can update the documented known error status codes with the error status code and the audit trail and the one or more recovery actions determined at 518.

Figure 6:
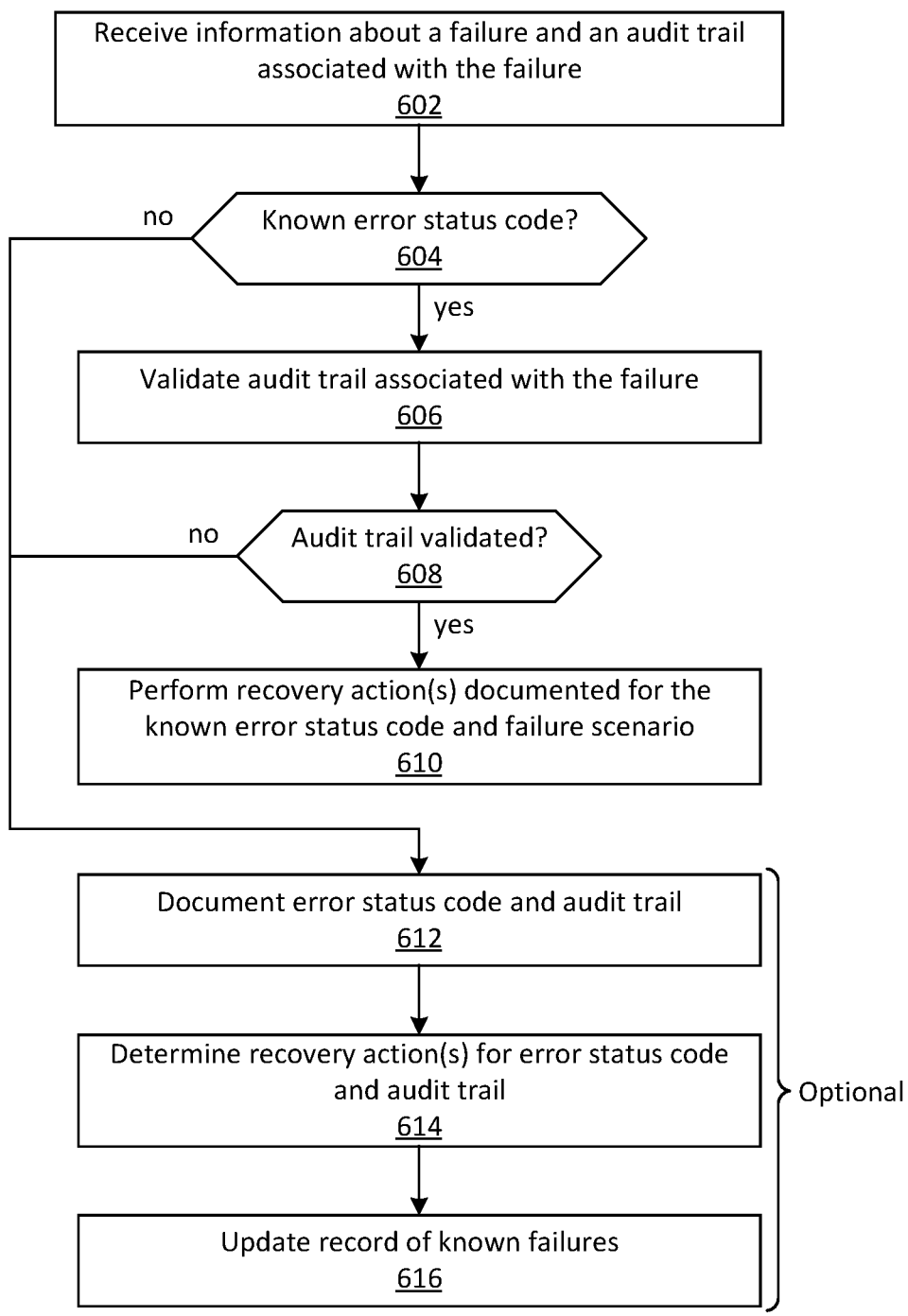
FIG. 6 is a flow diagram of an example process for auto-recovery of known failures in a high availability (HA) system, in accordance with an embodiment of the present disclosure.

FIG. 6 is a flow diagram of an example process 600 for auto-recovery of known failures in a high availability (HA) system, in accordance with an embodiment of the present disclosure. Illustrative process 600 may be implemented, for example, within the system described above in conjunction with FIG. 3.

With reference to process 600 of FIG. 6, at 602, information about a failure and an audit trail associated with the failure may be received. For the purposes of this discussion, it is assumed that the failure is of an application executing on a storage system that provides high availability. It is also assumed that a recovery process on the system (e.g., recovery process 306 of FIG. 3) is interoperating with a monitoring component of the high availability storage system to provide monitoring and recovery of failures on the high availability storage system. For example, the recovery process can receive from the monitoring component of the high availability storage system a request to recover a failure (e.g., an application execution failure) on the high availability storage system. The received request may include an error status code and an audit trail associated with the failure.

At 604, a check may be performed to determine if the error status code is a known error status code. If it is determined that the error status code is a known error status code, then, at 606, the audit trail associated with the failure may be validated to confirm that the audit trail of the failure is one of the incidents documented for the known error status code. For example, the recovery process can compare the audit trail associated with the failure to the failure scenarios documented for the known error status code to validate that the audit trail is one of the incidents documented for the known error status code.

At 608, if it is determined that the audit trail is validated, then, at 610, recovery action(s) documented in the for the known error status code and the failure scenario may be performed to recover the failure. For example, the recovery process can perform the recovery action(s) documented for the known error status code and the failure scenario confirmed to be the same as the audit trail. The recovery process may send the results of the recovery operation to the monitoring component of the high availability storage system in a response to the request to recover the failure.

Otherwise, if, at 604, it is determined that the error status code is not a known error status code or, if, at 608, it is determined that the validation of the audit trail fails, then, at 612, the error status code and the audit trail may optionally be documented. For example, the recovery process can store details of the error status code and the audit trail associated with the failure to a data store where it can subsequently be retrieved and used. The recovery process may send a response to the monitoring component of the high availability storage system informing the monitoring component that the failure is not a known failure.

At 614, one or more recovery actions for the error status code and the audit trail documented at 612 may optionally be determined. For example, the error status code and the audit trail documented at 612 may be retrieved from the data store and used to debug the issues that caused the failure and identify one or more recovery actions to recover from the failure.

At 616, a record of known failures may be updated. For example, the recovery process or another process can update the documented known error status codes with the error status code and the audit trail and the one or more recovery actions determined at 614.

FIG. 7 is a block diagram illustrating selective components of an example computing device 700 in which various aspects of the disclosure may be implemented, in accordance with an embodiment of the present disclosure. For example, illustrative computing device 700 can perform all or part of the processes described herein. As shown, computing device 700 includes one or more processors 702, a volatile memory 704 (e.g., random access memory (RAM)), a non-volatile memory 706, a user interface (UI) 708, one or more communications interfaces 710, and a communications bus 712.

Non-volatile memory 706 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 708 may include a graphical user interface (GUI) 714 (e.g., a touchscreen, a display, etc.) and one or more input/output (I/O) devices 716 (e.g., a mouse, a keyboard, a microphone, one or more speakers, one or more cameras, one or more biometric scanners, one or more environmental sensors, and one or more accelerometers, etc.).

Non-volatile memory 706 stores an operating system 718, one or more applications 720, and data 722 such that, for example, computer instructions of operating system 718 and/or applications 720 are executed by processor(s) 702 out of volatile memory 704. In one example, computer instructions of operating system 718 and/or applications 720 are executed by processor(s) 702 out of volatile memory 704 to perform all or part of the processes described herein (e.g., processes illustrated and described with reference to FIGS. 1 through 6). In some embodiments, volatile memory 704 may include one or more types of RAM and/or a cache memory that may offer a faster response time than a main memory. Data may be entered using an input device of GUI 714 or received from I/O device(s) 716. Various elements of computing device 700 may communicate via communications bus 712.

The illustrated computing device 700 is shown merely as an illustrative client device or server and may be implemented by any computing or processing environment with any type of machine or set of machines that may have suitable hardware and/or software capable of operating as described herein.

Processor(s) 702 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 702 may be analog, digital, or mixed signal. In some embodiments, processor 702 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 710 may include one or more interfaces to enable computing device 700 to access a computer network such as a Local Area Network (LAN), a Wide Area Network (WAN), a Personal Area Network (PAN), or the Internet through a variety of wired and/or wireless connections, including cellular connections.

In described embodiments, computing device 700 may execute an application on behalf of a user of a client device. For example, computing device 700 may execute one or more virtual machines managed by a hypervisor. Each virtual machine may provide an execution session within which applications execute on behalf of a user or a client device, such as a hosted desktop session. Computing device 700 may also execute a terminal services session to provide a hosted desktop environment. Computing device 700 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   monitoring, by a computing device, a status of a workflow execution; and
   responsive to a determination of a failure of the workflow execution, by the computing device:
   determining whether an error status code associated with the failure is a known error status code; and
   responsive to a determination that the error status code is a known error status code:
   comparing an audit trail of the workflow execution with a failure scenario documented for the known error status code, wherein the audit trail is of one or more events preceding the failure of the workflow execution, wherein the one or more events include one or more data storage access events of the workflow execution; and
   responsive to validating that the audit trail is the documented failure scenario based on the comparing:
   performing one or more recovery actions documented for the known error status code and the documented failure scenario.

2. The method of claim 1, further comprising, responsive to a determination of no failure of the workflow execution, continuing, by the computing device, monitoring the status of the workflow execution.

3. The method of claim 1, wherein monitoring the status of the workflow execution includes checking a status log.

4. The method of claim 1, wherein the audit trail is generated by the workflow.

5. The method of claim 1, further comprising:
   responsive to a determination that the error status code associated with the failure is not a known error status code, by the computing device:
   documenting the error status code and the audit trail of the workflow execution;
   determining one or more recovery actions for the documented error status code and the audit trail; and updating a record of known failures with the error status code, the audit trail, and the one or more recovery actions.

6. The method of claim 1, further comprising:
responsive to failing to validate that the audit trail is the documented failure scenario, by the computing device:
documenting the error status code and the audit trail of the workflow execution;
determining one or more recovery actions for the documented error status code and the audit trail; and
updating a record of known failures with the error status code, the audit trail, and the one or more recovery actions.

7. The method of claim 1, wherein the status of the workflow execution is provided by the workflow execution.

8. The method of claim 1, wherein the workflow execution includes an execution of an application.

9. A system comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
monitoring a status of a workflow execution; and
responsive to a determination of a failure of the workflow execution:
determining whether an error status code associated with the failure is a known error status code; and
responsive to a determination that the error status code is a known error status code:
comparing an audit trail of the workflow execution with a failure scenario documented for the known error status code, wherein the audit trail is of one or more events preceding the failure of the workflow execution, wherein the one or more events include one or more data storage access events of the workflow execution; and
responsive to validating that the audit trail is the documented failure scenario based on the comparing:
performing one or more recovery actions documented for the known error status code and the documented failure scenario.

10. The system of claim 9, wherein monitoring the status of the workflow execution includes checking a status log.

11. The system of claim 9, wherein the audit trail is generated by the workflow.

12. The system of claim 9, wherein the process further comprises:
responsive to a determination that the error status code associated with the failure is not a known error status code:
documenting the error status code and the audit trail of the workflow execution;
determining one or more recovery actions for the documented error status code and the audit trail; and
updating a record of known failures with the error status code, the audit trail, and the one or more recovery actions.

13. The system of claim 9, wherein the process further comprises:
responsive to failing to validate that the audit trail is the documented failure scenario:
documenting the error status code and the audit trail of the workflow execution;
determining one or more recovery actions for the documented error status code and the audit trail; and
updating a record of known failures with the error status code, the audit trail, and the one or more recovery actions.

14. The system of claim 9, wherein the workflow execution is an execution of an application.

15. A method comprising:
receiving, from a high availability (HA) system, information about a failure of a workflow execution and an audit trail associated with the failure, wherein the audit trail is of one or more events preceding the failure of the workflow execution, wherein the one or more events include one or more data storage access events of the workflow execution; and
responsive to a determination that an error status code associated with the failure is a known error status code:
comparing the audit trail of the failure with a failure scenario documented for the known error status code; and
responsive to validating that the audit trail is the documented failure scenario based on the comparing:
performing one or more recovery actions documented for the known error status code and the documented failure scenario.

16. The method of claim 15, wherein the failure is an application execution failure within the HA system.

17. The method of claim 15, further comprising:
responsive to a determination that the error status code associated with the failure is not a known error status code:
documenting the error status code and the audit trail of the failure;
determining one or more recovery actions for the documented error status code and the audit trail; and
updating a record of known failures with the error status code, the audit trail, and the one or more recovery actions.

18. The method of claim 15, further comprising:
responsive to failing to validate that the audit trail is the documented failure scenario:
documenting the error status code and the audit trail of the failure;
determining one or more recovery actions for the documented error status code and the audit trail; and
updating a record of known failures with the error status code, the audit trail, and the one or more recovery actions.

* * * * *